US007774963B2

(12) United States Patent
Puglisi

(10) Patent No.: US 7,774,963 B2
(45) Date of Patent: Aug. 17, 2010

(54) DISPLAY DEVICE WITH A PLURALITY OF ROTATABLE SLEEVE ELEMENTS, EACH HAVING A PLURALITY OF INDICIA THEREON

(75) Inventor: Marc J. Puglisi, Essex County, NJ (US)

(73) Assignee: Points of Light, Inc., Fairfield, NJ (US)

( * ) Notice: Subject to any disclaimer, the term of this patent is extended or adjusted under 35 U.S.C. 154(b) by 56 days.

(21) Appl. No.: 12/156,895

(22) Filed: Jun. 5, 2008

(65) Prior Publication Data

US 2009/0300955 A1 Dec. 10, 2009

(51) Int. Cl.
*G06F 3/00* (2006.01)

(52) U.S. Cl. .......................................... 40/334; 401/195

(58) Field of Classification Search ................... 40/586, 40/504, 503; 401/195
See application file for complete search history.

(56) References Cited

U.S. PATENT DOCUMENTS

| | | | | | |
|---|---|---|---|---|---|
| 1,830,102 | A | | 11/1931 | Felsenthal | |
| 2,339,514 | A | | 1/1944 | Ponath | |
| 2,785,100 | A | | 3/1957 | Yaw | |
| 3,010,224 | A | * | 11/1961 | Roberts | 434/140 |
| 3,109,251 | A | * | 11/1963 | Krueger | 40/503 |
| 4,928,416 | A | | 5/1990 | Penno | |
| 4,949,969 | A | * | 8/1990 | Johnson | 273/153 S |
| 4,983,062 | A | * | 1/1991 | Hour | 401/195 |
| 5,788,232 | A | * | 8/1998 | Binkley | 273/155 |
| D434,798 | S | | 12/2000 | Platts et al. | |
| 6,742,953 | B2 | | 6/2004 | Burden et al. | |
| 6,966,717 | B1 | * | 11/2005 | Kuo | 401/195 |
| 7,275,744 | B1 | | 10/2007 | Kuo | |
| 2005/0053414 | A1 | | 3/2005 | Collins | |
| 2005/0061960 | A1 | | 3/2005 | Huang | |
| 2005/0163556 | A1 | | 7/2005 | Eisel | |
| 2007/0059089 | A1 | | 3/2007 | Junkins | |

* cited by examiner

*Primary Examiner*—Cassandra Davis
(74) *Attorney, Agent, or Firm*—Howard C. Miskin, Esq.; Gloria Tsui-Yip, Esq.

(57) ABSTRACT

A display device having a plurality of rotatable sleeve elements, with each sleeve element having a plurality of indicia on its outer surfaces and a through opening. The through opening has a uniform cross-sectional shape that is generally circular, with at least one notch extending beyond the perimeter of the circle. The opposing surface of each sleeve element has at least one protrusion (or indentation) that corresponds in shape and size to at least one corresponding indentation (or protrusion) on the mating surface. When a plurality of sleeve elements are slidably and axially placed over the body abutting each other, the unique shape of the through opening of and the protrusion-indentation combination on each sleeve element allow the frictional rotation of the sleeve element with ease, but locks it at a predetermined position to provide a message from the combined indicia on the sleeve elements.

16 Claims, 4 Drawing Sheets

DISPLAY DEVICE WITH A PLURALITY OF ROTATABLE SLEEVE ELEMENTS, EACH HAVING A PLURALITY OF INDICIA THEREON

This application claims the benefit of pending U.S. patent application Ser. No. 29/293,169, filed Nov. 8, 2007, entitled "Writing Instrument with Display Surfaces."

FIELD OF THE INVENTION

The invention relates to a display device with a plurality of rotatable sleeve elements, each having a plurality of indicia thereon. In particular, an elongated device with a plurality of rotatable sleeve elements that allow the expression of different messages based on the combination and relative positioning of the plurality of indicia.

BACKGROUND OF THE INVENTION

Small devices providing one or more indicia are common. For example, writing instruments, such as pens and pencils, flashlights, charms, beverage containers, etc. often have indicia for decoration or advertisement. Most of these indicia are fixed and cannot be modified or altered to express different messages. For writing instruments, the indicia are typically imprinted on the outer surface of the body.

U.S. Patent Application Publication No. 2005/0053414 published on Mar. 10, 2005, to Mark G. Collins discloses a writing instrument with a plurality of rotatable beads along the body. The beads are of various sizes and shapes and may include different indicia on the exterior surfaces thereof for expressing different messages. Each bead has a round through opening, which is sleeved over the cylindrical ink cartridge to form the barrel of the writing instrument. Each bead is freely rotatable and, disadvantageously, the beads do not remain at a relative position with each other. U.S. Pat. No. D434,798 issued on Dec. 3, 2000, to Andrew J. Platts et al. discloses a similar writing instrument.

U.S. Patent Application Publication No. 2007/0059089 published on Mar. 15, 2007, to Mitch Junkins et al. discloses a writing instrument with separable objects positioned along the shaft that are, disadvantageously, restricted from rotating relative to one another. Each object has an anti-rotation configuration to prevent rotation with respect to each other. The anti-rotation configuration comprises corresponding half-circle cross-sectional opening through which a non-circular shaft is inserted through to restrict rotation. Further, each object has corresponding beads and recesses on the surfaces that abut other objects that further restrict relative rotation between the objects.

Therefore, there is a need for a device that provides a plurality of rotatable sleeve elements that can be frictionally rotated with ease and can be locked at different predetermined positions to provide different messages from the combined and relative positioning of the plurality of indicia on the sleeve elements.

SUMMARY OF THE INVENTION

The present invention provides a device with a plurality of rotatable sleeve elements, with each sleeve element having a plurality of indicia on its outer surfaces, with the combination of the indicia displaying and expressing different messages based on the relative positioning of the indicia.

The device of the present invention has an elongated tubular body portion with a plurality of sleeve elements axially and slidably moveable around the tubular body portion. Each sleeve element has a plurality of indicia on its outer surface, and an axial through opening being co-axial with and dimensioned to allow frictional rotation about the tubular body portion with ease. The through opening has a uniform cross-sectional shape that is generally circular, with at least one notch extending beyond the perimeter of the circle shape. Each sleeve element has an opposing surface that abuts another mating surface. On the opposing surface of each sleeve element is at least one protrusion (or indentation) that corresponds in shape and size to at least one corresponding indentation (or protrusion) on a mating surface.

When a plurality of sleeve elements are placed on the tubular body portion abutting each other, the unique shape of the through opening of and the protrusion-indentation combination on each sleeve element allow the rotation of the sleeve element, but locks it at a predetermined position to provide a message from the combined indicia on the sleeve elements. This advantageously allows the relatively fixed, but alterable, display and expression of different messages based on the different positioning of the indicia.

BRIEF DESCRIPTION OF THE DRAWINGS

A preferred embodiment of the present invention has been chosen for purposes of illustration and description and is shown in the accompanying drawings forming a part of the specification wherein.

DETAILED DESCRIPTION OF THE PREFERRED EMBODIMENTS

Figure 1:
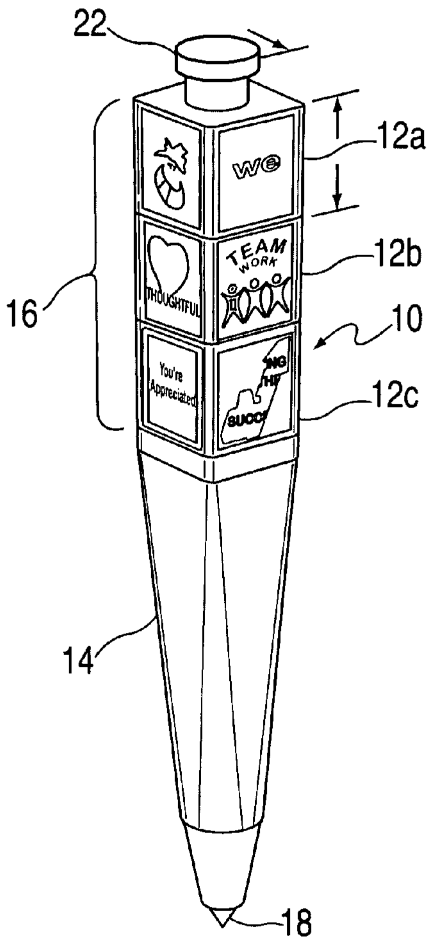
FIG. 1 is a writing instrument with three rotatable sleeve elements, with each sleeve element having indicia on each of its four outer surfaces.

With reference to the drawings, wherein the same reference number indicates the same element throughout, there is shown in FIG. 1 a writing instrument 10 showing an embodiment of the present invention with three rotatable sleeve elements 12*a*, 12*b* and 12*c*. Sleeve elements 12*a*-12*c* are stacked on top of each other. Each sleeve element 12*a*-12*c* has four outer surfaces 13*a*-13*d*, with each outer surface 13 having indicia thereon, totally twelve indicia.

Figure 2:
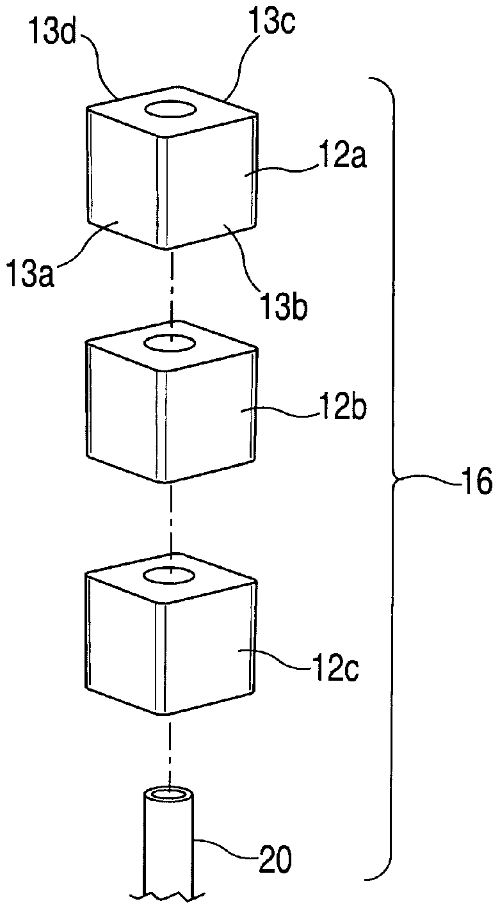
FIG. 2 is a simplified and exploded view of the upper body portion of the writing instrument of FIG. 1.

Writing instrument 10 has a lower body portion 14 and an upper body portion 16 extending from one end of the lower body portion 14. Extending from the other end of the lower body portion 14 is the writing end 18, i.e. tip of the pen or pencil. As shown in FIG. 2, the upper body portion 16 includes an elongated tubular body 20 with three sleeve elements 12*a*, 12*b* and 12*c* axially and slidably moveable around the tubular body 20. At the distal end of upper body portion 16 may be the actuation button 22 for controlling the writing end 18. The barrel containing the writing element, e.g. ink or lead, traverses and is within the upper and lower body portions 14 and 16 (not shown).

Figure 3:
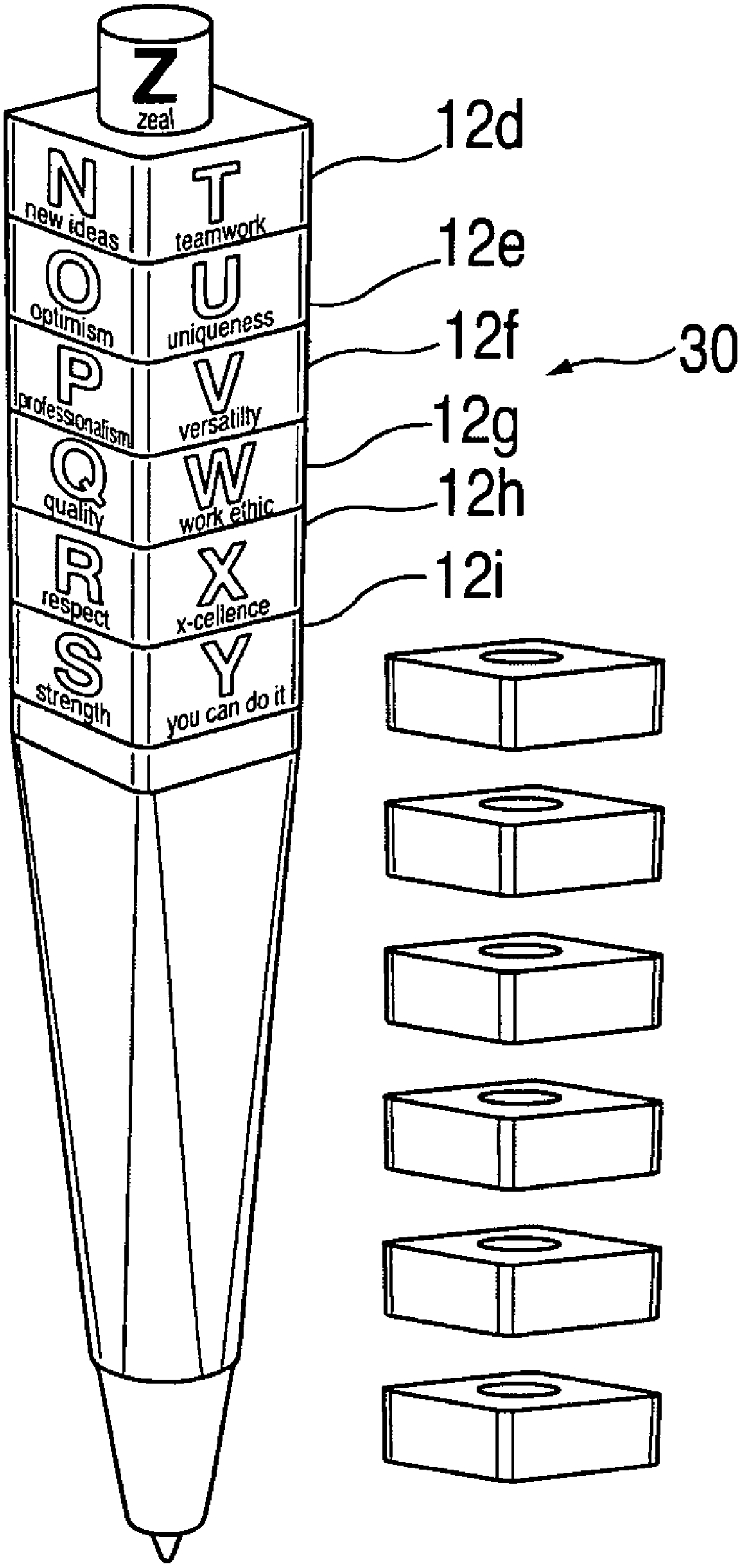
FIG. 3 is a writing instrument with six rotatable sleeve elements, with each sleeve element having indicia on each of its four outer surfaces.

FIG. 3 shows a writing instrument 30 similar to writing instrument 10 of FIG. 1, except that there are six rotatable sleeve elements 12*d*-12*i* stacked on top of each other. Writing instrument 30 provides additional outer surfaces for different and additional indicia, totally twenty-four indicia.

Figure 6:
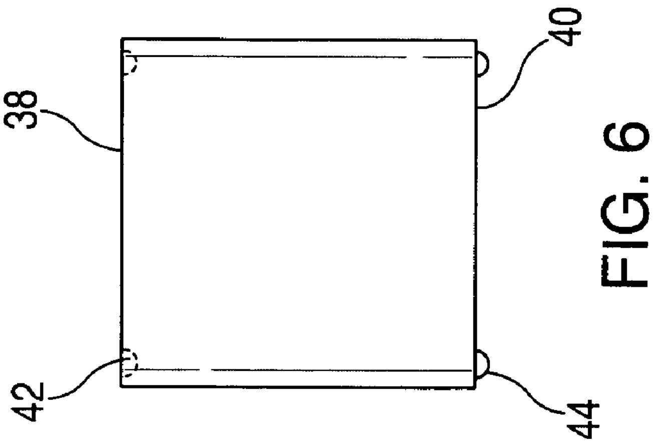
FIG. 6 is a side view of the sleeve element.
Figure 5:
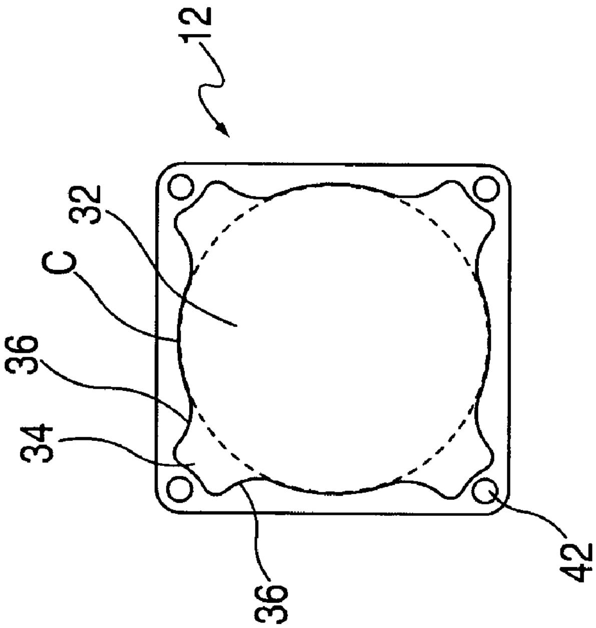
FIG. 5 is a top plan view of the sleeve element.
Figure 4:
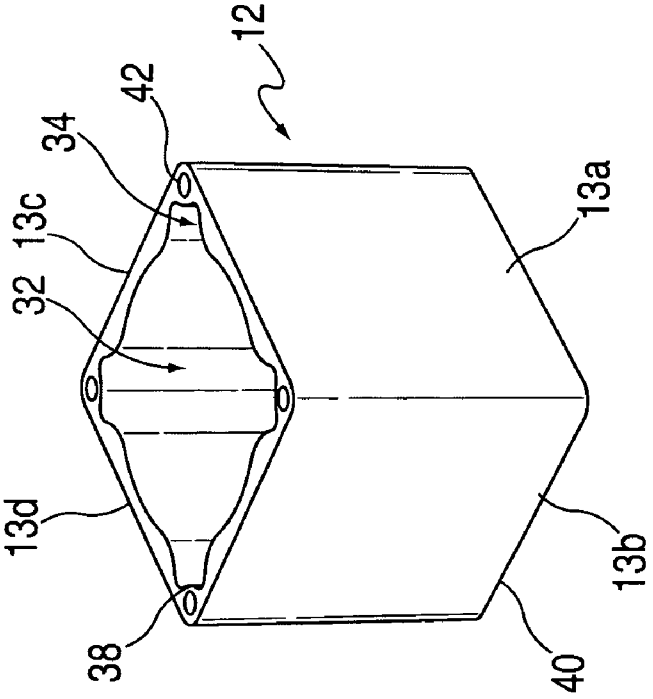
FIG. 4 is a perspective view of the sleeve element.

FIGS. 4-6 show the sleeve element 12. Sleeve element 12 has an axial through opening 32, which is co-axial with and dimensioned to allow frictional rotation about the tubular body 20 with ease. The through opening 32 has a uniform cross-sectional shape that is generally circular (marked by dotted circle C), with at least one notch 34 extending beyond the perimeter of the circle C. Each notch 34 has a generally isosceles trapezoidal shape with rounded corners. The junctures 36 where the circle C and notch 34 intersect are rounded or curved. Tubular body 20 is preferably dimensioned to be slightly smaller than the circle C such that tubular body 20 and portions of opening 32 that abut the tubular body 20 provides frictional hold to prevent free rotation. The notch 34 minimizes the frictional hold between the tubular body 20 and opening 32 to allow controlled rotation of the sleeve element 12 over the tubular body 20.

Each sleeve element 12 has an opposing surface 38 and a mating surface 40. On the opposing surface 38 is at least one indentation 42 (or protrusion) that corresponds in shape and size to at least one corresponding protrusion 44 (or indentation) on a mating surface. When a plurality of sleeve elements 12 are tightly stacked abutting each other over the tubular body 20, the indentation 42 of one sleeve element 12*b* mates with the protrusion 44 of another sleeve element 12*a* to align and lock the free rotation of the sleeve elements 12*a* and 12*b* relative to each other on the tubular body 20 to display a particular message based on the combined indicia on the sleeve elements 12. After rotating the sleeve element 12*a* relative to another sleeve element 12*b*, the sleeve elements 12*a* and 12*b* may be snapped back into position and alignment with the indentation 42 of sleeve element 12*b* mating the corresponding protrusion 44 of sleeve element 12*a*. The surface of the lower body portion 14 that abuts a sleeve element 12 may also have a corresponding indentation 42 to lock the free rotation of the sleeve element 12 relative to the lower body portion 14.

The combined cross sectional shape of the through opening 32 and indentation 42-protrusion 44 combination advantageously allows the relatively fixed, but alterable, display and expression of different messages based on the different positioning of the indicia on the sleeve elements 12. The sleeve elements 12 may have different length, width and height (see 12*a*-12*c* of FIGS. 1 and 12*d*-12*i* of FIG. 3). The sleeve elements 12 used on one device may be identical in size or different in size. The sleeve elements 12 of FIGS. 1-6 are shown to be a cube or block with four (4) outer surfaces 13*a*-13*d*. The sleeve elements 12 may have other shapes such as sphere, cylinder, or other polygonal shapes to provide a continuous or additional outer surfaces 13 for a plurality of indicia to be placed thereon.

Figure 7:
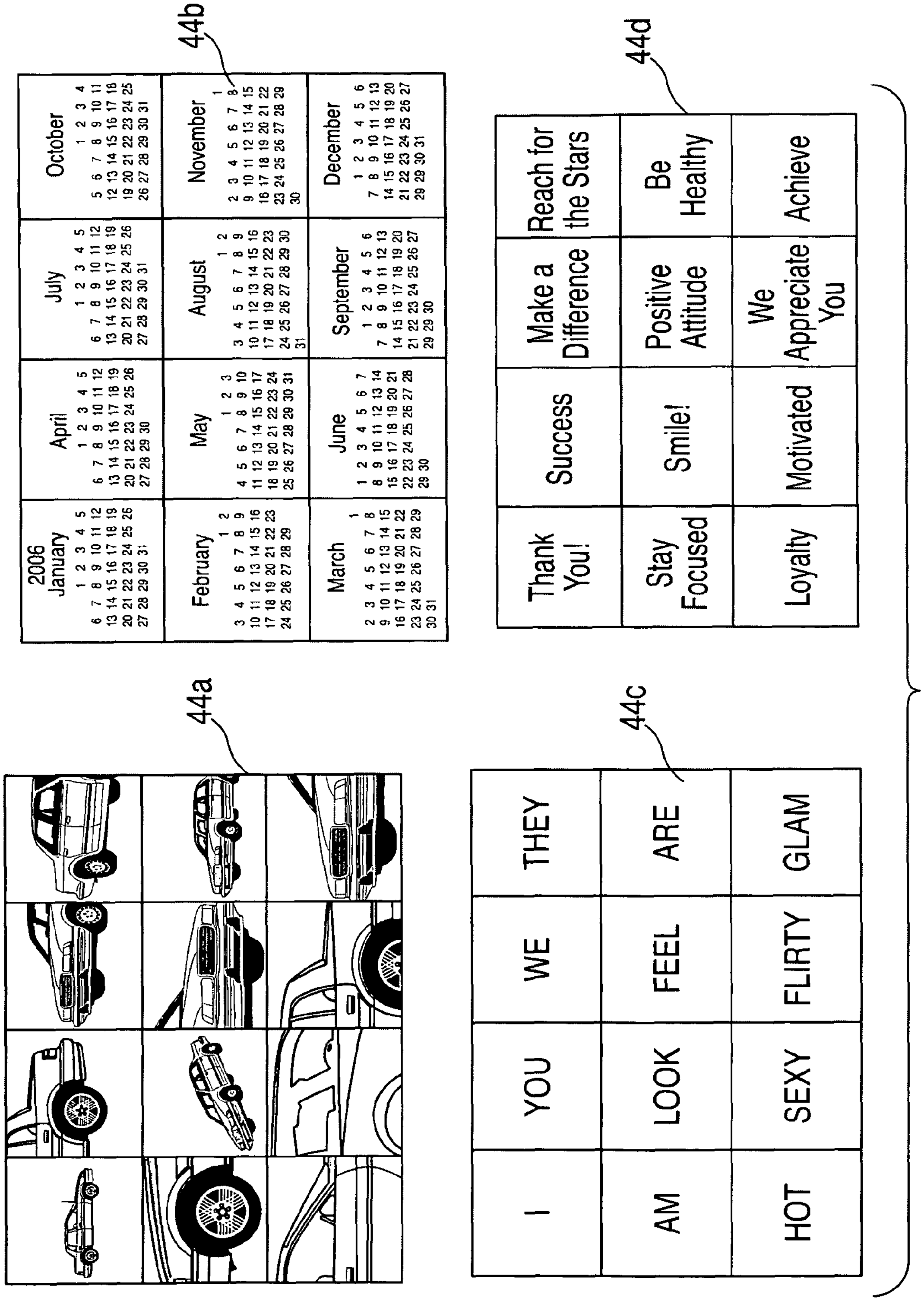
FIG. 7 shows samples of indicia for the sleeve elements shown in FIG. 1.

FIG. 7 illustrates some indicia 44*a*-44*d* that may be placed on the sleeve elements 12*a*-12*c* of FIG. 1. As illustrated, the indicia may be words, pictures, symbols, messages, designs, photos, etc. The relative positioning of the indicia can produce different messages. For example, for the indicia 44*c*, sixty-four (64) different messages can be created, such as: "I look sexy;" "I feel hot;" We are glam;" "You look flirty;" etc.

While the present invention is described as used on a writing instrument, it may also be used on flashlights, charms, etc.

Although certain features of the invention have been illustrated and described herein, other better modifications and changes will occur to those skilled in the art. It is, therefore, to be understood that the appended claims are intended to cover all such modification and changes that fall within the spirit of the invention.

What is claimed is:

1. A display device comprises:

(a) a tubular body defining an axis and having a dimension;

(b) a plurality of sleeve elements, each sleeve element having a through opening for axially sleeving over said body, each sleeve element having a plurality of outer surfaces, with each surface having indicia thereon;

wherein said through opening having an uniform cross-sectional shape of a circle with at least one notch extending beyond the perimeter of said circle, and dimensioned to be slightly larger than said dimension of said tubular body, and wherein each of said notch having a generally isosceles trapezoidal shape with rounded corners such that each sleeve element is frictionally rotatable in a controlled manner around said axis with ease to display different messages based on the relative positioning of said indicia on said outer surfaces.

2. The display device of claim 1 wherein each of said sleeve element is a cube having four outer surfaces.

3. The display device of claim 1 wherein the junctures where said circle intersects with said notch is rounded.

4. The display device of claim 1 wherein each sleeve element further having an opposing surface and a mating surface, with at least one protrusion extending from said opposing surface and at least one corresponding indentation on said mating surface, such that when a plurality of sleeve elements abut each other, said at least one protrusion and said at least one corresponding indentation mates with each other to align said plurality of sleeve elements and lock the free rotation of said plurality of sleeve elements relative to each other.

5. The display device of claim 4 wherein said protrusion and said indentation correspond to each other in size and shape.

6. The display device of claim 1 wherein each sleeve element further having an opposing surface and a mating surface, with at least one indentation on said opposing surface and at least one corresponding protrusion extending from said mating surface, such that when a plurality of sleeve elements abut each other, said at least one protrusion and said at least one corresponding indentation mates with each other to align said plurality of sleeve elements and lock the free rotation of said plurality of sleeve elements relative to each other.

7. The display device of claim 6 wherein said protrusion and said indentation correspond to each other in size and shape.

8. A writing instrument comprises:

(a) a lower body portion having first and second ends;

(b) a writing end extending from said first end of said lower body portion;

(c) an upper body portion extending axially from said second end of said lower body portion, said upper body portion being tubular and having a dimension;

(d) an actuation button at the distal end of said upper body portion for controlling said writing end;

(e) a barrel containing a writing element for said writing end traverses within said upper and lower body portions; and (f) a plurality of sleeve elements, each sleeve element having a through opening for axially sleeving over said tubular upper body portion, each sleeve element having a plurality of outer surfaces, with each surface having indicia thereon;

wherein said through opening having an uniform cross-sectional shape of a circle with at least one notch extending beyond the perimeter of said circle, and dimensioned to be slightly larger than said dimension of said upper body portion and wherein each of said notch having a generally isosceles trapezoidal shape with rounded corners such that each sleeve element is frictionally rotatable in a controlled manner around the axis of said upper body portion with ease to display different messages based on the relative positioning of said indicia on said outer surfaces.

9. The writing instrument of claim 8 wherein each of said sleeve element is a cube having four outer surfaces.

10. The writing instrument of claim 8 wherein the junctures where said circle intersects with said notch is rounded.

11. The writing instrument of claim 8 wherein each sleeve element further having an opposing surface and a mating surface, with at least one protrusion extending from said opposing surface and at least one corresponding indentation on said mating surface, such that when a plurality of sleeve elements abut each other, said at least one protrusion and said at least one corresponding indentation mates with each other to align said plurality of sleeve elements and lock the free rotation of said plurality of sleeve elements relative to each other.

12. The writing instrument of claim 11 wherein said second end of said lower body portion having at least one protrusion extending therefrom for mating with said corresponding indentation on said mating surface of one of said sleeve elements, such that when one of said sleeve elements abut said lower body portion, said at least one protrusion of said lower body portion and said at least one corresponding indentation of one of said sleeve elements mates with each other to align one of said sleeve elements and lock the free rotation of one of said sleeve elements relative to said lower body portion.

13. The writing instrument of claim 8 wherein each sleeve element further having an opposing surface and a mating surface, with at least one indentation on said opposing surface and at least one corresponding protrusion extending from said mating surface, such that when a plurality of sleeve elements abut each other, said at least one protrusion and said at least one corresponding indentation mates with each other to align said plurality of sleeve elements and lock the free rotation of said plurality of sleeve elements relative to each other.

14. The writing instrument of claim 13 wherein said second end of said lower body portion having at least one indentation thereon for mating with said corresponding protrusion on said mating surface of one of said sleeve elements, such that when one of said sleeve elements abut said lower body portion, said at least one indentation of said lower body portion and said at least one corresponding protrusion of one of said sleeve elements mates with each other to align one of said sleeve elements and lock the free rotation of one of said sleeve elements relative to said lower body portion.

15. The writing instrument of claim 8 having three sleeve elements tightly stacked abutting each other.

16. The display device of claim 1 further comprises a means for illumination.

* * * * *